Dec. 31, 1957  R. C. MILES  2,818,561
MOVING TARGET INDICATOR

Filed June 19, 1948  3 Sheets-Sheet 1

INVENTOR.
RAYMOND C. MILES
BY
*R. P. Morris*
ATTORNEY

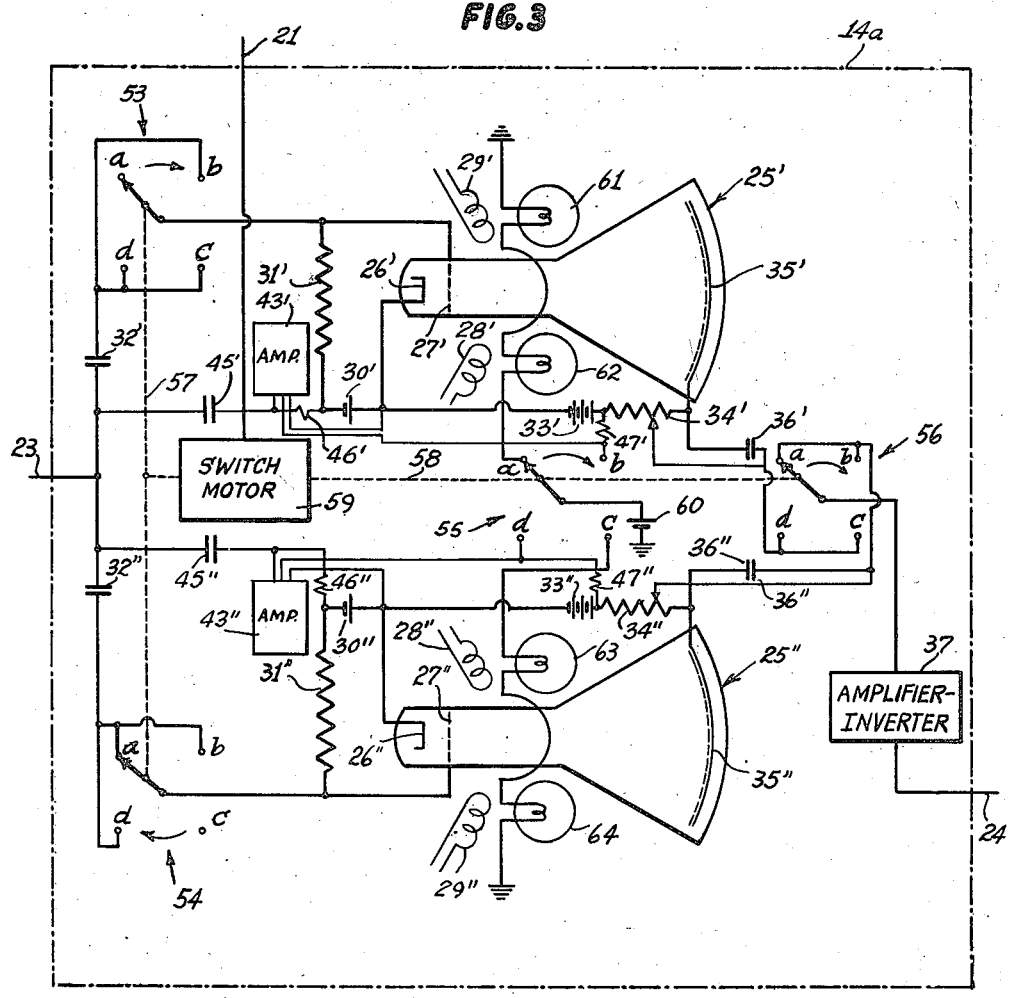
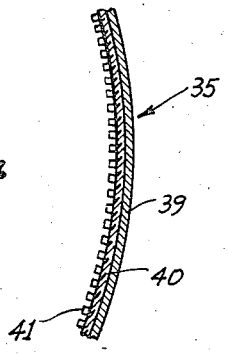

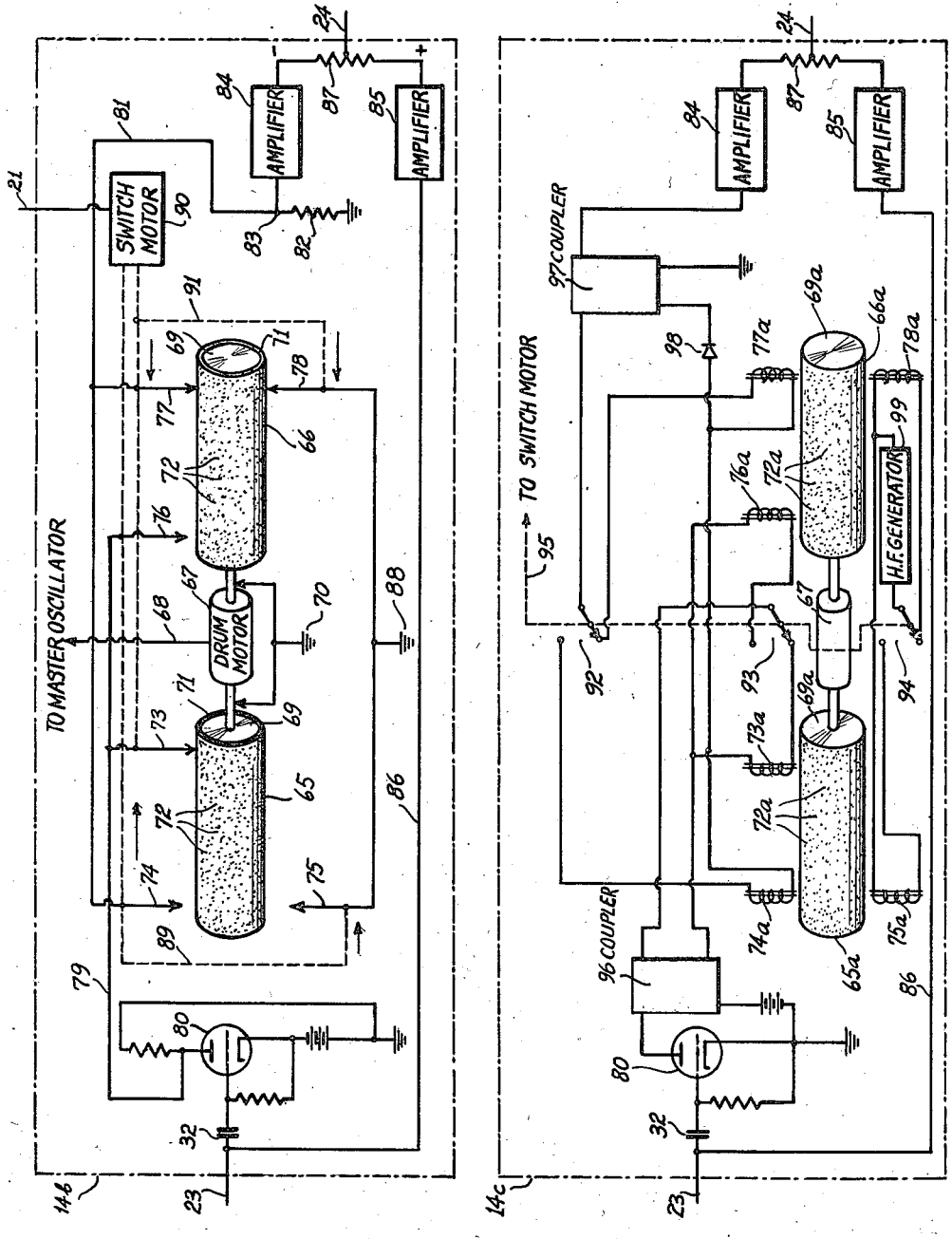

United States Patent Office 2,818,561
Patented Dec. 31, 1957

2,818,561

MOVING TARGET INDICATOR

Raymond Carl Miles, State College, Pa., assignor to International Telephone and Telegraph Corporation, a corporation of Maryland Application June 19, 1948, Serial No. 34,062

5 Claims. (Cl. 343—7.7)

The present invention relates to radar systems and, more particularly, to moving target indicators used in such systems.

In the conventional moving target indicator, wherein means is provided for sending out pairs of successive pulses and comparing the echoes of the pulses of each pair with each other in such a manner that cancellation occurs when corresponding echoes are received, there is generally employed some sort of delay network (e. g. liquid delay lines) which is usually quite sensitive to external influences, such as changes in ambient temperature, contamination of the liquid used, and so forth, whereby the accuracy of the system will be impaired.

In order to avoid these difficulties, it has already been proposed to derive moving target indications from pairs of successive reflected signals or echo pulses applied with alternate polarity to a single mosaic tube on whose screen the signals are retained for a certain period, the signals of a pair being arranged to take effect simultaneously whereby, if the signals are equal, the output of the tube will be zero. In such a system, however, as in the conventional moving target indicator referred to, the necessarily short interval between successive pulses will cause the system to discriminate not only against stationary objects but also against targets moving rapidly in radial direction or moving relatively slowly in tangential direction.

The general object of the present invention is to provide relatively simple means for giving a panoramic (i. e. both angular and radial) indication of moving targets whereby the location of fast or slow moving objects will be accurately identified.

Another object of the invention is to provide, in an indicator of the character described, means for indicating a movable target even where the range and bearing thereof coincide with those of a fixed target.

In accordance with the invention, there is provided a method of discriminating between echoes from fixed and moving objects which comprises the steps of storing energy from echoes received during each scanning sweep for a period equal to at least one scanning cycle and comparing the energy received during each portion of a scanning sweep with that stored during a corresponding portion of a preceding cycle, indications being derived from the difference between the energy received and stored during said corresponding sweep portions.

The invention also contemplates various arrangements for carrying the above method into practice; for this purpose, there may be provided a mosaic or array of discrete storage elements which, when activated or excited by signal energy derived from incoming pulse echoes, will be saturated to such an extent that, at least during the scanning cycle immediately following, such element will not be materially excited by signal energy of comparable level. According to the invention, it is possible to use radiant, galvanic or electromagnetic means for charging and/or discharging said storage elements.

The above and other features and objects will become apparent from the following detailed description, reference being had to the accompanying drawing in which:

Fig. 2a illustrates a detail referred to in connection with the embodiment of Figs. 2 and 3;

Fig. 3 illustrates another form of moving target discriminator according to the invention;

Fig. 4 illustrates a further form of moving target discriminator; and

Fig. 5 shows a modification of the moving target discriminator illustrated in Fig. 4.

Figure 1:
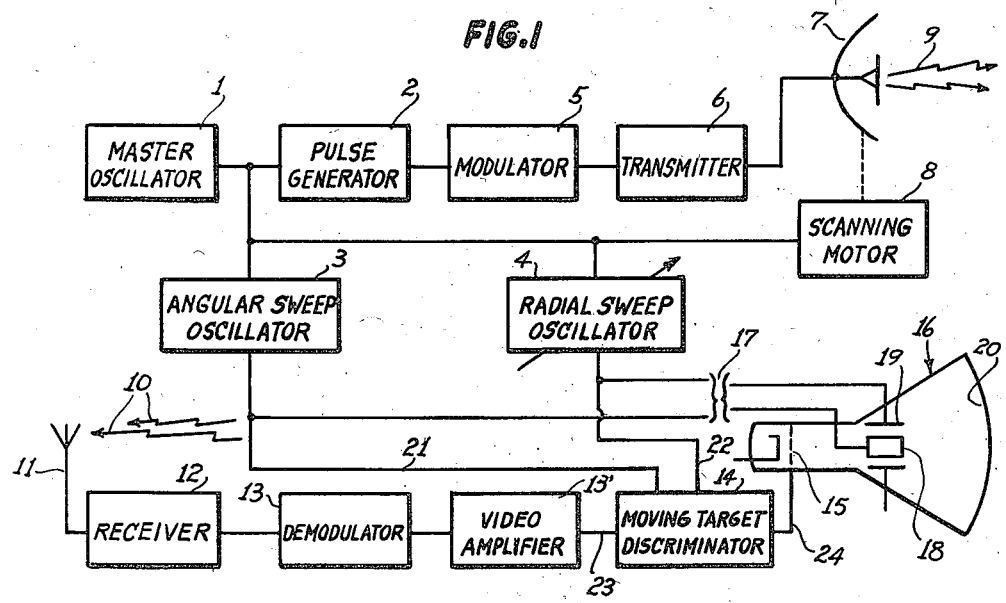
Fig. 1 is a diagram, mainly in block form, showing the general circuit arrangement of a moving target indicator system according to the invention.

Referring to Fig. 1, there is shown at 1 a master oscillator, of any known type and operating at suitable frequency, delivering synchronizing signals to a pulse generator 2, an angular sweep oscillator 3 and a radial sweep oscillator 4. As shown, the radial sweep oscillator 4 may be adjustable for the purpose of permitting variations in the range of the indicator, as will be readily understood by those skilled in the art. The pulses from generator 2 are fed to a modulator 5 the output of which is applied to a transmitter 6, the latter having the required number of ultra high frequency amplifier stages. Transmitter 6 feeds a directional antenna 7 whose directivity is varied cyclically by means shown, schematically, as a scanning motor 8, the latter being likewise controlled by the master oscillator 1.

The echoes 10 of the transmitted energy 9 are received by an antenna 11 and applied to a receiver 12 which feeds them, after suitable amplification, to a demodulator 13. The demodulated pulses are delivered to a video amplifier 13' and, thence, to a moving target discriminator 14 more fully described hereinafter. The output of the discriminator 14 is applied to the intensity control electrode 15 of the cathode ray tube 16, while the scanning voltages of sweep oscillators 3 and 4, suitably compounded as indicated at 17, are applied to the horizontal and vertical deflecting electrodes 18, 19 of the same tube. Indications are displayed on the screen 20 of the tube 16.

Leads 21, 22 extend from the angular sweep oscillator 3 and the radial sweep oscillator 4, respectively, to the moving target discriminator 14 for synchronization purposes as will become clear from the following. Other leads 23, 24 connect the indicator 14 with amplifier 13' and cathode ray tube 16, respectively.

Figure 2:
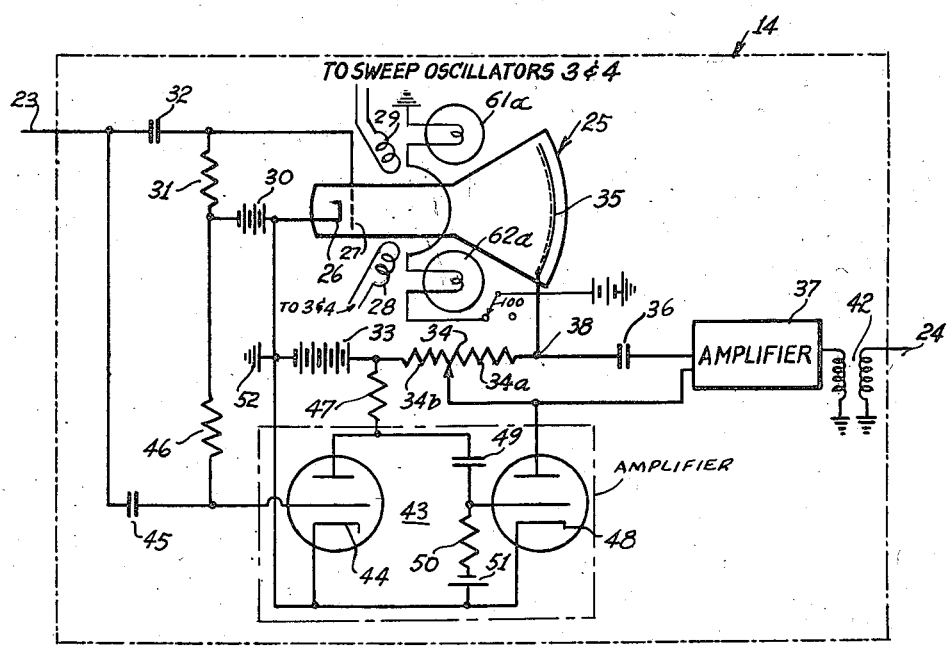
Fig. 2 illustrates one form of moving target discriminator forming part of the circuit arrangement shown in Fig. 1.

In the form of the invention illustrated in Fig. 2, the discriminator 14 is seen to comprise a cathode ray tube 25 conventionally provided with an electron gun shown here schematically as consisting of a cathode 26 and a control grid or intensity control electrode 27, and further provided with horizontal and vertical deflection means which, as indicated at 28, 29 may be of the electromagnetic type. Deflection coils 28, 29 are connected to oscillators 3 and 4 over leads 21 and 22, Fig. 1, signals on said leads 21, 22 being suitably compounded as were the signals at 17, Fig. 1.

The input circuit to cathode ray tube 25 comprises a biasing battery 30, a grid leak resistor 31 and a coupling condenser 32 through which video pulses are applied to grid 27 from conductor 23. The output circuit of tube 25 comprises a high tension battery 33, a load resistor 34 and a collector electrode 35, the common terminal 38 of resistor 34 and electrode 35 being connected to a coupling condenser 36 applying output signals to conductor 24 by way of an amplifier 37, and an output transformer 42. The input terminals of amplifier 37 are connected across the right-hand portion 34a of resistor 34 and transformer 42 is designed so that the polarity of the signals applied to the amplifier will be reversed for application to cathode ray tube 16 over lead 24.

Referring to Fig. 2a, which shows a fragmentary cross section of collector electrode 35 on an enlarged scale, it will be seen that this electrode comprises a metallic base or screen 39, an insulating coating 40 on said screen, and an array of spaced elements 41 separated from the screen 39 by the layer 40. The elements 41 are of conductive material and, together with the base 39, form a number of separate condensers connected in parallel to terminal 38. The bias applied to the grid 27 of tube 25 is such that the beam from the electron gun is normally cut off and will only be triggered on when positive signals are applied to condenser 32 over lead 23.

The leakage resistance of the dielectric layer 40 is selected high enough that each of the elements 41 may substantially retain any charge thereon for at least a full scanning cycle, yet should be so low that a discharge occurs within a few cycles if the element is not recharged. Thus, at the beginning of operation each of the condensers formed by respective elements 41 will be substantially completely discharged.

The operation of the discriminator so far as described is as follows:

Under the control of master oscillator 1, the directional antenna 7 and the beams of tubes 16, 25 are subjected to synchronous scanning displacement by the operation of motor 8 and angular sweep oscillator 3. The radial sweeps of the two beams are also synchronized by means of the oscillator 4. When an echo pulse is received on the antenna 11, the tube 25 will be unblocked instantaneously and electrons will impinge upon a particular storage element 41 which happens to be in the path of the beam, said element being thereupon charged negatively. A charging current now flows through load resistor 34, causing a negative pulse to appear at terminal 38 which pulse, after inversion in amplifier 37, and transformer 42, is applied to the grid 15 of tube 16 with a positive polarity, causing an increase in the brightness of the beam of the latter tube. Thus, a luminous spot will appear on screen 20, the location of the spot corresponding to that of the particular element 41 that had been excited.

The flow of a charging current through resistor 34 presupposes, however, that the particular element 41 was substantially discharged at the time when the beam impinged upon it; if, however, the element had been charged in the previous sweep, the current through resistor 34 will only be sufficient to replace the charge which may have leaked off during a single cycle and the rise in potential on terminal 38 will be too small to be noticeable on screen 20. Accordingly, when the reception of an echo pulse is due to reflection from a fixed object, such pulse will always tend to charge the same storage element and will not result in any appreciable output. If, however, echoes are received from a moving target, a different element will be excited thereby during each scanning sweep and an output pulse will be obtained each time, permitting the course of the target to be traced on the screen 20.

While the circuit shown in full lines in Fig. 2 is fully operative in the manner hereinabove disclosed, there is a slight disadvantage in the fact that the system may not readily detect the presence of a moving object whose range and bearing happens to coincide with a fixed object, such as, for example, an aircraft flying along a mountain range. Although by virtue of the added reflection, the amplitude of the received signal will be increased, such increase will hardly affect the output of the special cathode ray tube 25 since the pre-existing substantial saturation of the respective element or elements 41 will prevent any appreciable charging current from flowing through resistor 34. The difficulty may be overcome, however, by the addition of an amplifier 43, this amplifier being connected to the source of signals 23 in parallel with the cathode ray tube 25.

The input to the first stage 44 of amplifier 43 comprises a coupling condenser 45, bias battery 30, and a grid leak resistor 46. Stage 44 is connected across high tension battery 33 in series with an anode resistor 47 and is coupled to the second stage 48 by means of condenser 49 and grid leak resistor 50 in series with bias battery 51. The anode circuit of stage 48 includes battery 33 as well as the left-hand portion 34b of load resistor 34.

The cathodes of stages 44 and 48 and of tube 25 may be grounded as shown at 52.

The operation of the complete circuit arrangement shown in Fig. 2 is as follows:

When the electron beam impinges upon an uncharged element 41, current will flow through resistor 34 and the voltage drop across portion 34a thereof will result in a positive pulse on conductor 24 as heretofore described. At the same time, a negative pulse will appear on the grid of amplifier stage 48 which will diminish the anode current drawn by this stage, whereby the voltage drop across resistor portion 34b will be reduced. This voltage drop, however, is not communicated to the secondary of output transformer 42 and, hence, has no direct effect upon the intensity of the beam of tube 16.

On the other hand, it will be seen that any rise in the anode potential of stage 48 will also raise the potential of collector electrode 35, hence will determine the amount of charge which will saturate the condensers or storage elements 41. If, therefore, a particular element 41 had been saturated for a particular signal level and, at the proper instant, a pulse of greater amplitude is received, the potential of collector electrode 35 will rise and additional charging current will flow through resistor portion 34a. Thus, it will be seen that the temporary superposition of echoes from a movable and a stationary target will produce an indication on screen 20 corresponding to the instantaneous position of the movable target.

While the self-discharging condenser elements 41 as described above will be found satisfactory for many purposes, it may be desirable in certain instances to provide means for rapidly discharging each storage element so that an element once excited may again become available before an appreciable number of scanning cycles have elapsed. To this end elements 41 may be made photoemissive and a pair of lamps 61a, 62a provided. Normally a switch 100 is opened so that the lamps are not illuminated. Closing switch 100 will energize the lamps illuminating the surface elements 41 causing neutralization of any charge thereon.

In Fig. 3 is shown an alternative moving target discriminator 14a which may be substituted for that shown in Fig. 2.

The discriminator 14a comprises two special cathode ray tubes 25′, 25″ which are in all respects similar to tube 25 in Fig. 2, being provided with respective cathodes 26′, 26″, control grids 27′, 27″, deflecting elements 29′, 29″, and 28′, 28″, and collector electrodes 35′, 35″. The latter electrodes are again of the type shown in Fig. 2a, yet in the present case the insulating layer 40 may have a very high leakage resistance. Furthermore, the elements 41 are of photosensitive material for reasons which will presently become apparent.

Each tube 25′, 25″ has an input circuit comprising, respectively, coupling condenser 32′, 32″, grid leak 31′, 31″, bias battery 30′, 30″, and an input control switch indicated generally at 53, 54, respectively. The arms of switches 53, 54 are ganged with the arms of two further switches 55, 56 by means of linkages 57, 58 connecting said arms with switch motor 59 for synchronous operation.

Switch motor 59 may be controlled from angular sweep oscillator 3 by way of conductor 21.

Switch 56 is an output control switch and connects the output circuits of tubes 25', 25", comprising high tension batteries 33', 33", load resistors 34', 34" and coupling condensers 36', 36", respectively, to output conductor 24 by way of amplifier-inverter 37. Condensers 32', 32" are connected to input conductor 23 in parallel.

Furthermore, each of the cathode ray tubes 25', 25" has associated therewith a set of lamps, only two of which are shown for each tube at 61, 62 and 63, 64, respectively. These lamps are positioned so that, when energized, they will illuminate the photosensitive elements 41 of collector electrodes 35', 35", respectively, whereby said elements will acquire a positive charge which will neutralize any negative charge existing thereon, hence will make each element susceptible to renewed excitation by the beam of the cathode ray tube. Thus, by flashing a particular set of lamps, the condenser elements forming the mosaic or array of a respective cathode ray tube will be completely discharged, whereupon a plurality of scanning sweeps will activate certain of said elements and produce output pulses in the manner heretofore described. For this purpose, the arm of switch 55 is connected to a source of energy 60 whereby the sets of lamps 61, 62 and 63, 64 may be selectively flashed in a cycle of operation involving the following steps:

*First step.*—The arms of all the switches 53 through 56 are on their respective contacts *a*. Tube 25" is operative, its input being connected to condenser 32" and its output to amplifier 37 by switches 54, 56, respectively. Lamps 61, 62 are lit, being connected to battery 60 by the switch 55; hence the storage elements of collector electrode 35' are in the process of being deactivated. Switch 53 is inoperative since its contact *a* is insulated. After the scanning cycle is completed, switch motor 59 advances all switch arms in the direction of the arrows until they reach contacts *b*.

*Second step.*—Tube 25" continues to function in same manner as before. Lamps 61, 62 are extinguished. The input of tube 25' is now connected to condenser 32' and a pattern of charges is formed on the collector electrode 35', but indication of stationary targets is prevented since the output connection of tube 25' is still open at switch 56. After the second scanning cycle is completed, the switch arms advance onto contacts *c*.

*Third step.*—This is the reverse of the first step. The arm of switch 54 now stands on its insulated contact *c*, and both the input and output circuits of tube 25" are broken. Lamps 63 and 64 are lit. Output signals from tube 25' reach the amplifier 37 by way of switch 56, these signals conveying information of the location of moving targets only since the condenser elements charged in the preceding sweep will not produce appreciable output pulses. After the third scanning cycle is completed, the switch arms reach contacts *d*.

*Fourth step.*—This is the reverse of the second step. All lamps 61 through 64 are extinguished. Tube 25' produces output pulses as during the preceding step. The output of tube 25" is still cut off, but a new pattern is established on the condenser array of electrode 35" after the obliteration of all charges thereon in the previous scanning cycle. Tube 25" thus prepares for effective operation after the fourth scanning cycle, whereupon the cycle of operations is repeated.

In connection with storage tubes 25' and 25" a circuit for increasing the storage capacity of the screens to permit detection of moving targets partially obscured by mountains or large reflecting objects may be provided. To this end there may be provided amplifiers 43' and 43", respectively, similar to amplifier 43 shown in Fig. 2. The connections of the amplifiers are shown through elements which are designated by numerals identical with corresponding elements of Fig. 2, except they are differentiated by a prime or double prime markings respectively.

The invention is not limited to the storing of signal energy by radiation, but also contemplates the selective activation of discrete storage elements by other methods, such as galvanic or electromagnetic excitation. Referring to Fig. 4, there is shown a moving target discriminator 14*b* comprising a pair of drums 65, 66 driven synchronously by a motor 67, the operation of motor 67 being in turn synchronized with that of radial sweep oscillator 4 by a connection 68 leading to the master oscillator 1. The construction of each drum is similar to that of electrode 35 (Fig. 2*a*), each drum consisting of a metallic body 69 (shown grounded at 70), a layer 71 of insulating material surrounding this body, and a mosaic of discrete conductive particles or elements 72 distributed over the periphery of the drum and separated from its body 69 by the layer 71. Again, each of the particles 72 forms a separate condenser with the metallic body 69.

Each drum 65, 66 is provided with a set of three brushes, indicated at 73, 74, 75 and 76, 77, 78, respectively. Brushes 73, 76 are a pair of charging electrodes and are connected in parallel, by means of a conductor 79, to the output electrode of a conventional amplifier 80 which also acts as a signal inverter; the input of this amplifier is connected to lead 23 by way of coupling condenser 32. Brushes 74, 77 are pick-up electrodes and are connected in parallel, by means of conductor 81, to an output resistor 82 having its ungrounded terminal 83 connected to an amplifier 84. A second output amplifier 85 is connected directly to input lead 23 by way of conductor 86, the outputs of amplifiers 84, 85 being connected across a balancing resistor 87 to whose substantial midpoint is connected the output lead 24. Brushes 75, 78 are discharge electrodes shown grounded at 88.

A mechanical linkage 89 interconnects 74, 75 and 76 with one another and with a switch motor 90 for simultaneous displacement of said brushes in the axial direction of drums 65, 66, the remaining brushes 73, 77 and 78 being similarly interconnected with one another and with motor 90 by a mechanical linkage 91. Switch motor 90 may again be synchronized from angular sweep oscillator 3 over conductor 21. The mechanical linkages 89, 91 may be endless conveyor belts, reversible lead screws or the like. The essential part is that, after each scanning cycle, the motor 90 reverses the direction of travel of all the brushes, linkages 89 and 91 always displacing their respective sets of brushes in opposite directions as indicated by the arrows. Furthermore, the various brushes are in contact with the surfaces of their respective drums only when traveling in a predetermined direction (from right to left in Fig. 4), being out of contact therewith when traveling in the opposite direction. Thus, when the charging brush of one drum is in engaged position, the pick-up and discharge brushes of this particular drum will be inoperative, and vice versa.

In the position shown in Fig. 4, charging brush 73 is in contact with the surface of drum 65, applying to the particles 72 thereof signals derived from the output of amplifier 80. Pick-up brush 74 and discharge brush 75 of drum 65 are inoperative, as is the charging brush 76 of drum 66. Pick-up brush 77, however, applies to amplifier 84 signals corresponding to potentials previously stored, by means of charging brush 76, on the particles 72 of the drum 66. Since, during a corresponding part of the preceding scanning cycle, charging brush 76 occupied precisely the present position of pick-up brush 77, it follows that brush 77 will encounter a charged particle or element 72 whenever a pulse corresponding to an echo from a stationary object appears on the input lead 23. Thus, in such a case, pulses of opposite polarity will appear simultaneously at the inputs of amplifiers 84, 85, respectively, whereby the outputs of the two amplifiers will balance and the potential of conductor 24 will not change. If, however, an echo pulse from a moving target is received, no balancing potential will be picked up by the brush 77 and a positive pulse will appear on the lead 24.

On the other hand, should brush 77 encounter a charged element in the absence of a signal on the input lead 23 (thus indicating the presence of a target at a particular location during the preceding cycle only), lead 24 will be driven negative whereby a luminous spot will not appear on the screen 20 of indicator 16.

It will be understood that during the succeeding scanning cycle brush 74 will slide over the elements charged by the brush 73 during the present cycle, thus taking the place of brush 77 in applying balancing potentials to the amplifier 84 over conductor 81.

Discharge brush 78 trails slightly behind pick-up brush 77, applying ground to the elements 72 scanned by the latter brush. In this manner, all the condensers in the mosaic of drum 66 will be discharged before charging brush 76 resumes its operation during the following scanning cycle. The relationship between brushes 74 and 75 of drum 65 is analogous to that between brushes 77 and 78.

It should be pointed out that the illustration of a radial displacement of brushes 73 through 78, relative to the drums 65 and 66, is strictly schematic; no such movement need actually take place, since the brushes may effectively be rendered operative and inoperative by the provision of simple switching means. This is shown in Fig. 5 which represents a discriminator 14c similar to discriminator 14b of Fig. 4 but operating by electromagnetic rather than galvanic means; for the sake of clarity, the mechanical linkages 89, 91 and the switch motor 90 of Fig. 4 have been omitted in Fig. 5.

In the form of the invention shown in Fig. 5, the brushes 73 through 78, Fig. 4, have been replaced by electromagnetic coils 73a through 78a, respectively. Drums 65a, 66a differ from drums 65, 66 in that the particles 72a are of ferro-magnetic material preferably supported on a non-magnetic body 69a. Switches 92, 93 and 94, controlled by the switch motor 90 through a linkage 95, selectively render the charging, pick-up and discharge elements 73a through 78a operative. Charging coil 73a or 76a receives magnetizing current from amplifier 80, by way of input coupler 96 and switch 93, whenever a pulse appears on lead 23; thus, certain of the particles 72a in the path of the charging coil will be magnetized and remain in this condition for the duration of a scanning cycle. Pick-up coil 74a or 77a, upon encountering a premagnetized particle 72a, produces a voltage pulse across the input of amplifier 84, by way of switch 92 and output coupler 97, the polarity of this pulse being such that the effect of a simultaneously appearing pulse in the input of amplifier 85 will be balanced and no output pulse will appear on conductor 24. Rectifier 98 in series with the coupler 97 is necessary because a voltage pulse of opposite polarity will appear across a pick-up coil whenever the latter slides off a charged particle, the rectifier preventing this pulse from reaching amplifier 84.

The discharge coils 75a, 78a are alternately connected across a high-frequency generator 99, whereby all particles passing a coil energized by source 99 will be instantaneously demagnetized. The discharge elements 75a, 78a again trail slightly behind their respective pick-up elements 74a, 77a. In the illustrated position of the switches 92, 93, 94 coils 73a, 77a and 78a are active. These coils are assumed to be traveling from right to left, as was the case with the corresponding electrodes 73, 77 and 78 in Fig. 4; the remaining coils will then simultaneously advance in the opposite direction. After a scanning cycle is completed, the direction of travel of all the coils is reversed, as is the position of switches 92, 93 and 94. Thus it will be seen that the operation of the two systems shown in Figs. 4 and 5 is substantially the same.

Although the invention has been described with reference to certain now preferred embodiments, it is to be distinctly understood that I do not wish to be limited to the particular forms of the invention described and illustrated and that various modifications and adaptations thereof may occur to those skilled in the art without departing from the spirit or exceeding the scope of the invention.

What is claimed is:

1. A moving target discriminator for radar receivers, comprising a cathode ray tube, means for producing an electron beam in said tube, an array of discrete condenser elements in the path of said beam, means for deflecting said beam successively across all of the condenser elements of said array in a plurality of scanning sweeps, means for normally suppressing said beam, circuit means normally maintaining said condensers at a potential more positive than that of said beam producing means whereby, upon impingement of said beam upon anyone of said condensers, a charge will be built up on the latter, resulting in the flow of a charging current through said circuit means, said circuit means including a circuit responsive to received radar pulses for increasing said positive potential proportionally to the amplitude of the received pulses, means for momentarily unblocking said beam upon reception of a radar pulse, whereby charging current will flow upon impingement of said beam upon an uncharged condenser only, means for deriving an output pulse from said charging current, and discharge means adapted to remove a charge on any of said condensers after an interval equal to at least the duration of a scanning sweep.

2. A moving target discriminator for radar receivers, comprising a pair of cathode ray tubes, means for producing an electron beam in each of said tubes, an array of discrete condenser elements in the path of each of said beams, means for synchronously deflecting said beams successively across all of the condenser elements of said arrays, respectively, in a plurality of scanning sweeps, means for normally suppressing said beams, first and second output means normally maintaining the condensers of one and the other tube, respectively, at a potential more positive than that of the respective beam producing means whereby, upon impingement of a respective beam upon any one of said condensers, a charge will be built up on the latter, resulting in the flow of a charging current through said circuit means, first and second input means adapted momentarily to unblock the beam of one and the other tube, respectively, upon reception of a radar pulse, whereby charging current will flow in the respective output means upon impingement of said beam upon an uncharged condenser only, first and second means for discharging all of the condensers of one and the other tube, respectively, means for deriving an output pulse from said charging current, and switch means adapted to render said first discharging means effective while connecting said pulse deriving means to said second output means, and vice versa, activation of either of said discharging means occurring at intervals corresponding to not less than two successive scanning sweeps.

3. A discriminator according to claim 1, wherein said condensers form part of a single collector electrode comprising a metallic base, a dielectric layer on said base and a plurality of discrete conductor elements on said layer, said conductor elements consisting of photo-sensitive material, said discharge means comprising a source of light adapted to illuminate all of said conductor elements simultaneously.

4. A discriminator according to claim 2, wherein the output means of each tube, respectively, remains disconnected from said pulse deriving means during at least one scanning sweep following operation of the respective discharge means, an initial pattern of charges being built up on the condensers of the respective array during said one scanning sweep.

5. A discriminator according to claim 2, wherein the condensers of each of said arrays form part of a respective collector electrode comprising a metallic base, a dielectric layer on said base and a plurality of discrete conductor elements on said layer, said conductor elements consisting of photo-sensitive material, said first and second discharge means comprising respective sources of light adapted to illuminate all of the conductor elements of a respective array simultaneously.

References Cited in the file of this patent

UNITED STATES PATENTS

| | | |
|---|---|---|
| 2,407,000 | Evans | Sept. 3, 1946 |
| 2,408,742 | Eaton | Oct. 8, 1946 |
| 2,410,424 | Brown | Nov. 5, 1946 |
| 2,422,135 | Sanders | June 10, 1947 |
| 2,437,173 | Rutherford | Mar. 2, 1948 |
| 2,440,301 | Sharpe | Apr. 27, 1948 |
| 2,450,946 | Evans | Oct. 12, 1948 |
| 2,491,450 | Holmes | Dec. 13, 1949 |
| 2,512,144 | Emslie | June 20, 1950 |